US008931499B2

(12) United States Patent
Clever et al.

(10) Patent No.: US 8,931,499 B2
(45) Date of Patent: Jan. 13, 2015

(54) BALL AND SOCKET BREAKAWAY CONNECTOR

(75) Inventors: Bryan William Clever, Liberty Township, OH (US); Matthew Ryan Lauber, Cincinnati, OH (US)

(73) Assignee: OPW Fueling Components Inc., Hamilton, OH (US)

( * ) Notice: Subject to any disclaimer, the term of this patent is extended or adjusted under 35 U.S.C. 154(b) by 256 days.

(21) Appl. No.: 13/303,604

(22) Filed: Nov. 23, 2011

(65) Prior Publication Data

US 2013/0125989 A1 May 23, 2013

(51) Int. Cl.
| F16L 37/32 | (2006.01) |
| F16K 31/00 | (2006.01) |
| B67D 7/32 | (2010.01) |
| F16L 27/04 | (2006.01) |
| F16L 27/047 | (2006.01) |
| F16L 37/40 | (2006.01) |
| F16L 55/10 | (2006.01) |

(52) U.S. Cl.
CPC .............. *F16K 31/00* (2013.01); *B67D 7/3218* (2013.01); *F16L 27/04* (2013.01); *F16L 27/047* (2013.01); *F16L 37/32* (2013.01); *F16L 37/40* (2013.01); *F16L 55/1015* (2013.01)
USPC ..... 137/1; 137/68.14; 137/614.04; 251/149.6

(58) Field of Classification Search
CPC ... F16L 55/1015; F16L 55/1007; F16L 37/30; F16L 37/38; F16L 37/40; F16L 37/32
USPC ................ 137/614.03–614.06, 614, 1; 285/2; 251/149.1, 149.6
See application file for complete search history.

(56) References Cited

U.S. PATENT DOCUMENTS

| 3,797,510 | A | * | 3/1974 | Torres et al. ............... 137/68.14 |
| 4,269,226 | A | | 5/1981 | Allread |
| 4,328,822 | A | | 5/1982 | Wilhelm |
| 4,800,913 | A | * | 1/1989 | Nitzberg et al. ........... 137/68.14 |

(Continued)

FOREIGN PATENT DOCUMENTS

| DE | 4323758 | 4/1994 |
| EP | 0555558 | 8/1993 |

(Continued)

OTHER PUBLICATIONS

International Search Report and Written Opinion, International Application No. PCT/US2012/064953 (Feb. 4, 2013).

*Primary Examiner* — Kevin Lee
(74) *Attorney, Agent, or Firm* — Thompson Hine L.L.P.

(57) ABSTRACT

A breakaway assembly including a first connector including a ball portion movably received therein and a second connector including a coupling portion. The assembly is movable between a first configuration in which the coupling portion is removably received in the ball portion and the first and second connectors together define a fluid path through which fluid may flow, and a second configuration in which the coupling portion is not received in the ball portion. The assembly is configured to move from the first configuration to the second configuration when a sufficient separation force is applied to the assembly. The assembly further includes a valve positioned in one of the first or second connectors. The valve is configured to be in an open position when the assembly is in the first configuration to allow fluid to flow therethrough, and to move to a closed position.

48 Claims, 12 Drawing Sheets

(56) References Cited

U.S. PATENT DOCUMENTS

| | | | |
|---|---|---|---|
| 4,827,977 A | 5/1989 | Fink, Jr. | |
| 4,899,792 A * | 2/1990 | Podgers | 137/68.14 |
| 5,209,262 A | 5/1993 | Carow et al. | |
| 5,228,474 A * | 7/1993 | Nimberger | 137/614.04 |
| 5,297,574 A | 3/1994 | Healy | |
| 5,320,133 A * | 6/1994 | Nimberger | 137/614.04 |
| 5,346,260 A * | 9/1994 | Meyer-Berg et al. | 285/1 |
| 5,365,973 A | 11/1994 | Fink, Jr. et al. | |
| 5,570,719 A | 11/1996 | Richards et al. | |
| 5,695,221 A * | 12/1997 | Sunderhaus | 285/1 |
| 6,095,190 A | 8/2000 | Wilcox et al. | |
| 6,182,695 B1 | 2/2001 | Coates, III et al. | |
| 6,192,934 B1 * | 2/2001 | Coates et al. | 137/614.04 |
| 6,308,727 B1 | 10/2001 | Healy | |
| 6,799,596 B2 | 10/2004 | Leibert | |
| 7,021,345 B2 * | 4/2006 | Webb | 137/68.11 |
| 7,575,023 B2 | 8/2009 | Fraser | |

FOREIGN PATENT DOCUMENTS

| | | |
|---|---|---|
| EP | 0623771 | 11/1994 |
| FR | 2689958 | 10/1993 |

* cited by examiner

BALL AND SOCKET BREAKAWAY CONNECTOR

The present invention is directed to a breakaway connector for use in a fluid dispensing system.

BACKGROUND

Breakaway connectors are typically utilized in fluid dispensing systems, such as gasoline refueling stations and the like. The breakaway connectors are designed to provide a break in the fluid system, which can then be sealed/closed, when a sufficient breakaway force is applied thereto. For example, in a drive-away event, the user of a refueling unit may inadvertently leave the nozzle in the vehicle refueling tank and then drive away. Breakaway connectors are designed to provide a breakaway point at which the hose or system can be separated, and also provide a closing valve to prevent or minimize loss of fuel.

Current breakaway connectors typically have a limited amount of flexibility, and may be able to separate in only a linear fashion. Such breakaway connectors may utilize a short connecting hose, also termed a whip hose, to provide flexibility to the breakaway system. During a drive-off event, the whip hose and main hose are stretched until the breakaway connector is separated. The energy stored in the stretched hoses is translated back as recoil, which can cause the whip hose to damage the dispenser and/or whip hose.

SUMMARY

In one embodiment, the present invention is a breakaway connector which provides flexibility such that the connector can break away at any of a variety of angles. More particularly, in one embodiment, the invention is a breakaway assembly including a first connector including a ball portion movably received therein and a second connector including a coupling portion. The assembly is movable between a first configuration in which the coupling portion is received in the ball portion and the first and second connectors together define a fluid path through which fluid may flow, and a second configuration in which the coupling portion is not received in the ball portion. The assembly is configured to move from the first configuration to the second configuration when a sufficient separation force is applied to the assembly. The assembly further includes a valve positioned in one of the first or second connectors. The valve is configured to be in an open position when the assembly is in the first configuration to allow fluid to flow therethrough, and to move to a closed position when the assembly is moved to the second configuration to generally block the flow of fluid therethrough.

BRIEF DESCRIPTION OF DRAWINGS

FIG. 1A is a detail view of the area indicated in FIG. 1;

DETAILED DESCRIPTION

Figure 1:
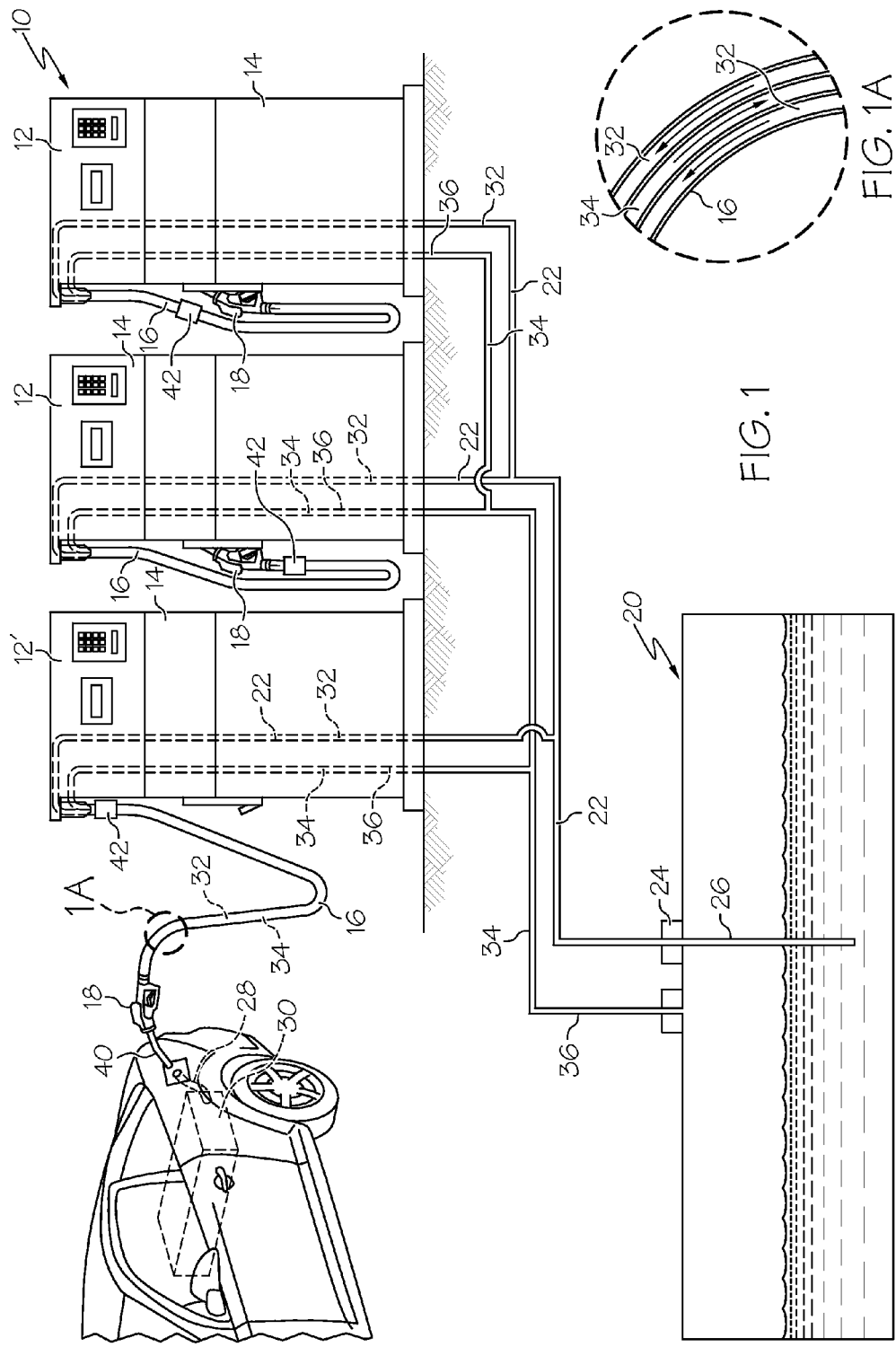
FIG. 1 is a schematic representation of a refueling system utilizing a breakaway connector.

FIG. 1 is a schematic representation of a refilling system 10 including a plurality of dispensers 12. Each dispenser 12 includes a dispenser body 14, a hose 16 coupled to the dispenser body 14, and a nozzle 18 positioned at the distal end of the hose 16. Each hose 16 may be generally flexible and pliable to allow the hose 16 and nozzle 18 to be positioned in a convenient refilling position as desired by the user/operator.

Each dispenser 12 is in fluid communication with a fuel/fluid storage tank 20 via a liquid or fluid conduit or path 22 that extends from each dispenser 12 to the storage tank 20. The storage tank 20 includes or is fluidly coupled to a fuel pump 24 which is configured to draw fluid/fuel out of the storage tank 20 via a pipe 26. During refilling, as shown by the in-use dispenser 12' of FIG. 1, the nozzle 18 is inserted into a fill pipe 28 of a vehicle fuel tank 30. The fuel pump 24 is then activated to pump fuel from the storage tank 20 to the fluid conduit 22, hose 16 and nozzle 18 and into the vehicle fuel tank 30 via a fuel or fluid path 32 of the system 10.

In some cases, the system 10 may also include a vapor path 34 extending from the nozzle 18, through the hose 16 and a vapor conduit 36 to the ullage space of the tank 20. For example, as shown in FIG. 1A, in one embodiment the vapor path 34 of the hose 16 is received in, and generally coaxial with, an outer fluid path 32 of the hose 16. The nozzle 18 may include a flexible vapor boot or bellows, sleeve or the like (not shown) of the type well known in the art which is coupled to, and circumferentially surrounds, a spout 40 of the nozzle 18.

The bellows is designed to form a seal about the spout 40 when the spout 40 is inserted into the fill pipe 28. The bellows help to capture vapors and route the vapors into the vapor path 34, although vapors can also be captured with nozzles 18 lacking a bellows. In addition, some systems 10 may lack the vapor path 34, in which case the system 10 may lack the vapor conduit 36, and the hose 16 may lack the vapor path 34 therein. It should also be understood that the system 10 disclosed herein can be utilized to store/dispense any of a wide variety of fluids, liquids or fuels, including but not limited to petroleum-based fuels, such as gasoline, diesel, natural gas, biofuels, blended fuels, propane, oil or the like, or ethanol the like.

Each dispenser 12 may include a breakaway connector 42 associated therewith, which can be located at various positions on the dispenser 12, or along the system 10. For example, the left-most dispenser 12' of FIG. 1 utilizes a breakaway connector 42 at the base end of the hose 16; the middle dispenser 12 utilizes a breakaway connector 42 positioned adjacent to the nozzle 18; and the right-most dispenser 12 utilizes a breakaway connector 42 at a middle position of the hose 16. However, it should be understood that the breakaway connector 42 can be positioned at any of a wide variety of positions along the length of the hose 16, or at other positions in the refueling system 10.

Figure 2:
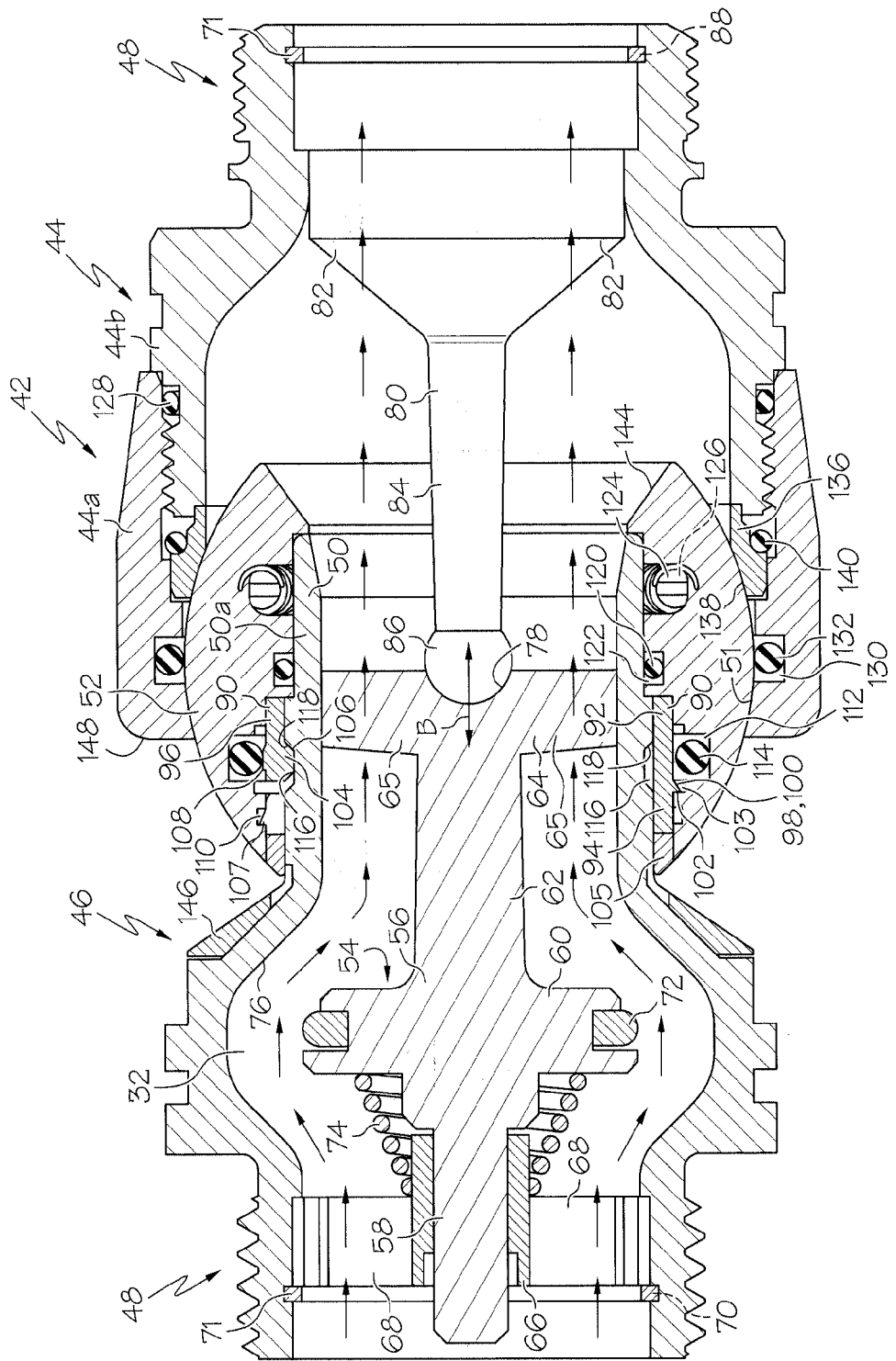
FIG. 2 is a side cross section of a first embodiment of the breakaway connector, shown in its connected configuration.

As shown in FIG. 2, a first embodiment of the breakaway connector 42 includes a housing, or first connector 44, releasably connected to a spud, or second connector 46. The breakaway connector 42 and connectors 44, 46, may be generally annular. The spud 46 is typically connected to an upstream portion of the system 10/hose 16, and the housing 44 is typically connected to a downstream portion of the system 10/hose 16 (it should be understood that terms used in relation to the direction of flow, such as "upstream" and "downstream," are used herein with respect to the direction of the flow of fluids/fuel to be dispersed (i.e. left-to-right in FIG. 2), as opposed to the direction of vapor flow, unless specified otherwise). However, if desired the spud 46 can be connected to a downstream component, and the housing 44 connected to an upstream component. Both the spud 46 and housing 44, in the illustrated embodiment, include threaded outer surfaces 48 for securing those connector portions to the associated upstream and downstream components (as shown in FIGS. 1 and 10). However, the threaded surfaces 48 could be internally threaded surfaces (see, e.g., spud 46 of FIGS. 8-11), or various other coupling structures may be used.

The spud 46 includes a generally tubular or channel-shaped coupling portion 50, which can have a variety of shapes in cross section, as will be described in greater detail below. The coupling portion 50 is removably received in a ball 52 of the housing 44, as will be described in greater detail below. The spud 46 further includes a poppet valve 54 positioned therein. The poppet valve 54 includes a body portion 56 having an upstream stem 58, a general cylindrical flange portion 60 positioned downstream relative to the stem 58, an extension portion 62 positioned downstream of the flange portion 60, and an downstream guide 64 positioned at a downstream end of the extension 62. The downstream guide 64 includes, or is defined by, a plurality of radially-outwardly extending fins 65 which thereby allow fluid to flow by/through the guide 60. The stem 58 is received in a generally cylindrical upstream guide 66 which is centered in the spud by a plurality of radially-extending fins 68. The guide 66 (and its fins 68) are axially held inside the spud 46 by a retaining ring 71 received in a groove 70 on the inner surface of the spud 46. The poppet valve 54 further includes a seal 72 positioned on the flange portion 60.

The downstream guide 64 of the poppet valve 54 is closely slidably received in the inner walls of the coupling portion 50 of the spud 46. The poppet valve 56 further includes a spring 74 positioned on the upstream side of the flange portion 60 such that the spring 74 is trapped between the upstream guide 66 and the flange portion 60. The poppet valve 54 is thereby biased, by the spring 74, to a closed position in which the seal 72 engages the poppet valve seat 76 (see FIG. 3).

The extension portion 62/downstream guide 64 of the poppet valve 54 includes a socket portion 78 positioned at an axial downstream end thereof. In the illustrated embodiment, the socket portion 78 is generally spherical (following industry convention, a surface which has a spherical profile or surface, yet which is not necessarily a complete sphere, is nevertheless described herein as spherical). However, the socket portion 78 can have various other shapes besides spherical, such as conical or other shapes, but such a configuration shall still be considered to be able to form a ball-and-socket joint as that term is used herein and in the claims. As shown in the embodiments of FIGS. 8-11, a seal, such as an O-ring 79 or the like, may be positioned in the socket portion 78 if desired.

The housing 44 includes a hold-open stand 80 positioned therein. In particular, in the embodiment shown in FIGS. 2-4, the hold-open stand 80 includes a plurality of fins 82 which extend radially outwardly (to allow fluid to flow past them), and an extension or retaining portion 84 which extends axially forwardly (i.e., upstream) from the fins 82. The distal upstream end of the extension portion 84 terminates in a spherical ball portion 86. The ball portion 86 is receivable in the socket portion 78, as shown in FIG. 2. The hold-open stand 80 is fixedly retained in the housing 44 by a retaining ring 71 received in a groove 88 on the inner surface of the housing 44. If the socket portion 78 is spherical, the portion 86 can have shapes other than spherical, such as conical or cylindrical, and such a configuration shall still be considered to constitute a ball-and-socket joint as that term is used herein and in the claims.

During normal operation, the spud 44 and housing 46 are arranged in their first state or configuration, as shown in FIG. 2, in which the first 44 and second 46 connector portions are coupled together and define a fluid conduit, or fluid path 32 through which fluid may flow, as shown by the arrows of FIG. 2. The defined fluid conduit 32 enables a relatively high volume flow of fluid therethrough. In addition, the conical shape of the spring 74 helps to smoothly guide fluid around the flange portion 60. The ball portion 86 of the hold-open stand 80 engages the socket portion 78 of the poppet valve 54, thereby compressing the spring 74 and keeping the poppet valve 54 in its open position, wherein the seal 72 is spaced away from the seat 76.

Figure 3:
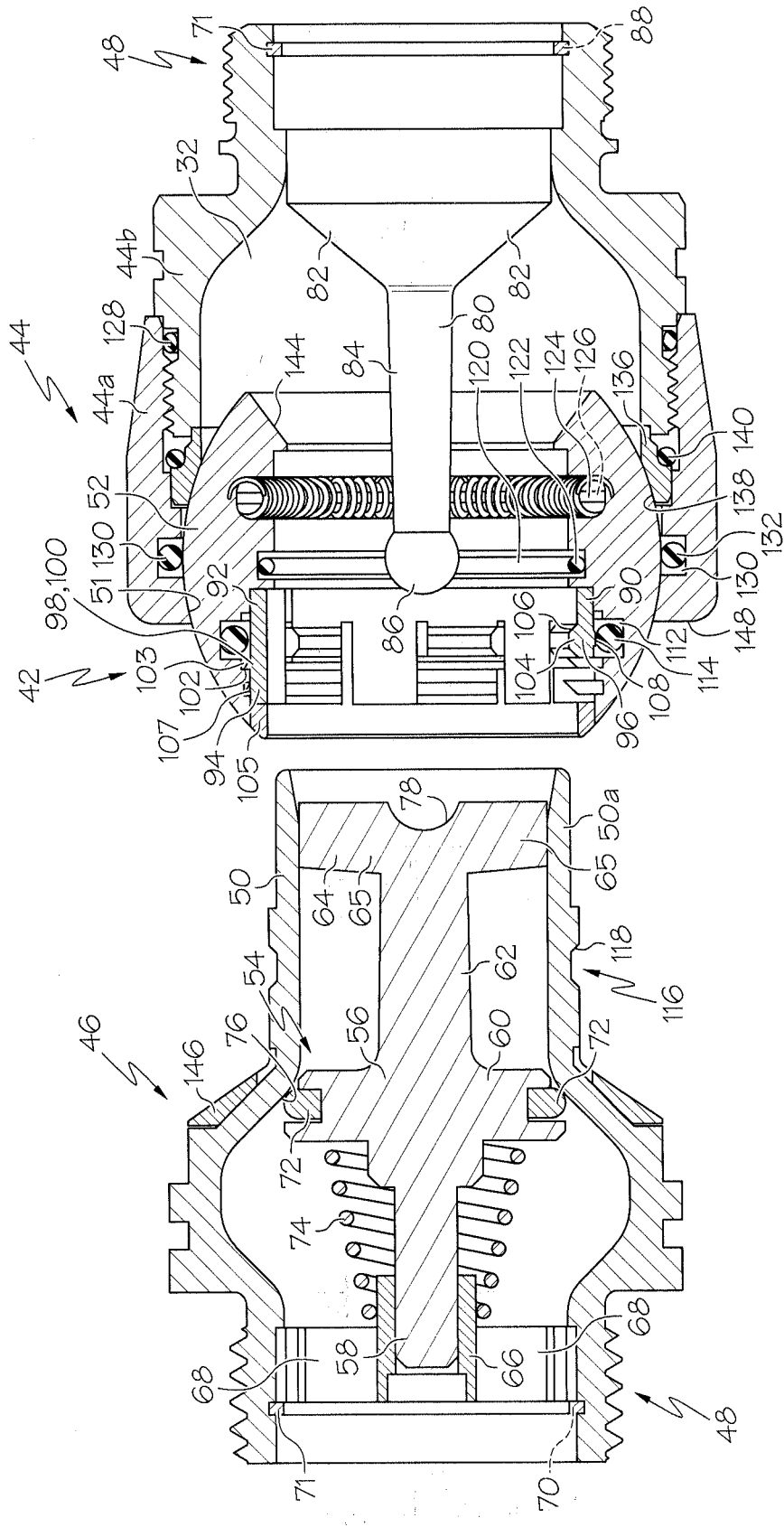
FIG. 3 is a side cross section of the breakaway connector of FIG. 2, shown in its disconnected configuration.

When sufficient separation forces are applied to the connector 42 (i.e. forces applied at least partially along the axis of the housing 44 and/or spud 46), the breakaway connector 42 moves to its second, or separated, state or configuration as shown in FIG. 3. When the housing 44 is pulled away from the spud 46, the hold-open stand 80 of the housing 44 is pulled away from the poppet valve 54, thereby causing the ball portion 86 to be extracted out of the socket portion 78 of the poppet valve 54. This movement of the housing 44/hold-open stand 80 enables the poppet valve 54 to move to its closed position, as shown in FIG. 3 in which the seal 72 engages the poppet valve seat 76, as biased by the spring 74 (and possibly aided by the pressure of fluid in the spud 46). It should be noted that the break-away force required to separate the connector 42 need not necessarily be initially axially aligned with the connector 42/housing 44/spud 46. If the break-away force is applied at an angle from the central axis of the connector 42, the ball and socket joints (formed by the ball 52 and socket 51, and the ball portion 78/socket portion 78) pivot/rotate to allow the break-away force to be applied axially to the connector 42, as will be described in greater detail below.

As can be seen in comparing the length of travel of the seal 72 to move to its closed position with the length of travel required to extract the coupling portion 50 from the ball 52, the seal 72 engages the seat 76 before the coupling portion 50 is fully retracted out of the ball 52. This design helps to ensure that the poppet valve 54 is fully closed before the connector 42 is completely decoupled to minimize any leaks or contamination during a separation event. In addition, this feature ensure that, during re-connection, the poppet 54 is not opened until the coupling portion 50 has engaged the seal 120, which reduces potential spraying during re-connection. Moreover, as can be seen in FIG. 3, the axially upstream portions of the ball 52 extend axially forwardly (upstream) of the hold-open stand 80/ball portion 86. In this manner, the ball 52 surrounds and protects the hold-open stand 80 from damage after a separation event.

Movement of the poppet valve 54 from its open (FIG. 2) and closed (FIG. 3) positions (and vice versa) is smoothly guided by the engagement between the downstream guide 64 and the inner surface of the coupling portion 50, and the stem 58 and upstream guide 66. The provision of two such cooperating guide surfaces at opposite ends of the poppet valve 54 helps to eliminate binding of the poppet valve 54 and ensure consistent and proper operation of the valve 54. In addition, the guide surfaces 64/50, 58/66 help to keep the body portion 56 of the poppet valve 54 centered to ensure that the force of the poppet spring 74 is applied to the center of the poppet valve 54/poppet body portion 56, even when the connector 42 is in a pivoted configuration (FIG. 4) as will be described in greater detail below.

The connector 42 is reusable and may be configured such that the spud 46 and housing 44 are reconnectable (i.e. movable from the configuration of FIG. 3 to that of FIG. 2) without requiring any repair or replacement of any components of the connector 42, as will be described in greater detail below. In particular, when the housing 44 and spud 46 are reconnected, the hold-open stand 80 engages the socket portion 78 of the poppet valve 54. When sufficient axial compression forces are applied to the connector 42 during the reconnection process, the hold-open stand 80 moves the body 56 of the poppet valve 54 upstream, thereby moving the seal 72 away from the poppet valve seat 76 until the connector 42 is in the position shown in FIG. 2. In one embodiment, it may be desired to replace the coupling ring 90 after a separation event.

Figure 5:
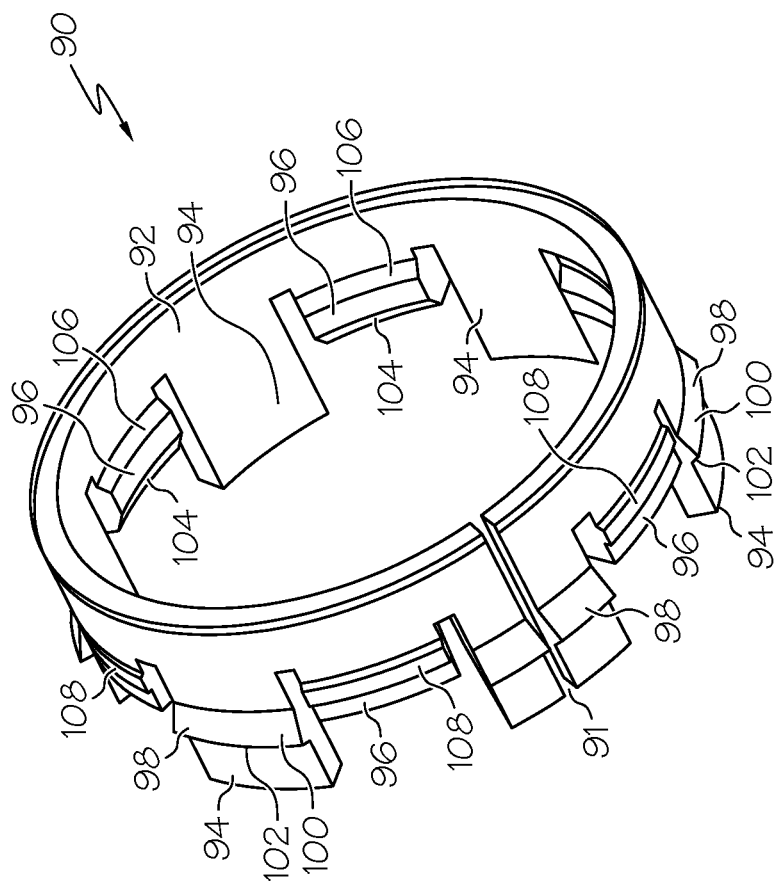
FIG. 5 is a perspective view of a coupling ring of the connector of FIG. 2.

As shown in FIG. 5, in one embodiment a coupling ring 90 is used to releasably secure the spud 46 and housing 44. In particular, in the illustrated embodiment the coupling ring 90 is generally annular having a base portion 92 and a plurality of generally axially extending securing flanges 94 and releasable flanges 96 extending away from the base portion 92. In the illustrated embodiment the flanges alternate between the longer securing flanges 94 and shorter releasable flanges 96. For example, in the illustrated embodiment, the coupling ring 90 includes six securing flanges 94 and six releasable flanges 96, although the number and arrangement of the flanges 94, 96 can be varied as desired.

Each securing flange 94 includes a ramp-shaped locking tab 98 on its radially outer surface. Each locking tab 98 has a surface 100 that is angled (i.e. extending at a non-parallel angle relative to the central axis), and locking surface 102 (extending at a perpendicular angle to the central axis, in the illustrated embodiment). Each releasable flange 96 includes a tab 104 on its radially inner surface, each tab 104 having an angled engagement surface 106 extending at a non-parallel angle relative to the central axis of the connector 42/spud 46/housing 42. Each releasable flange 96 is elastically deflectable in the radial direction and may also have an optional step, flange or protrusion 108 on its radially outer surface. The protrusion 108 can be used to increase the force applied to/by the O-ring 114 (described below) to increase the desired separation force.

Figure 4:
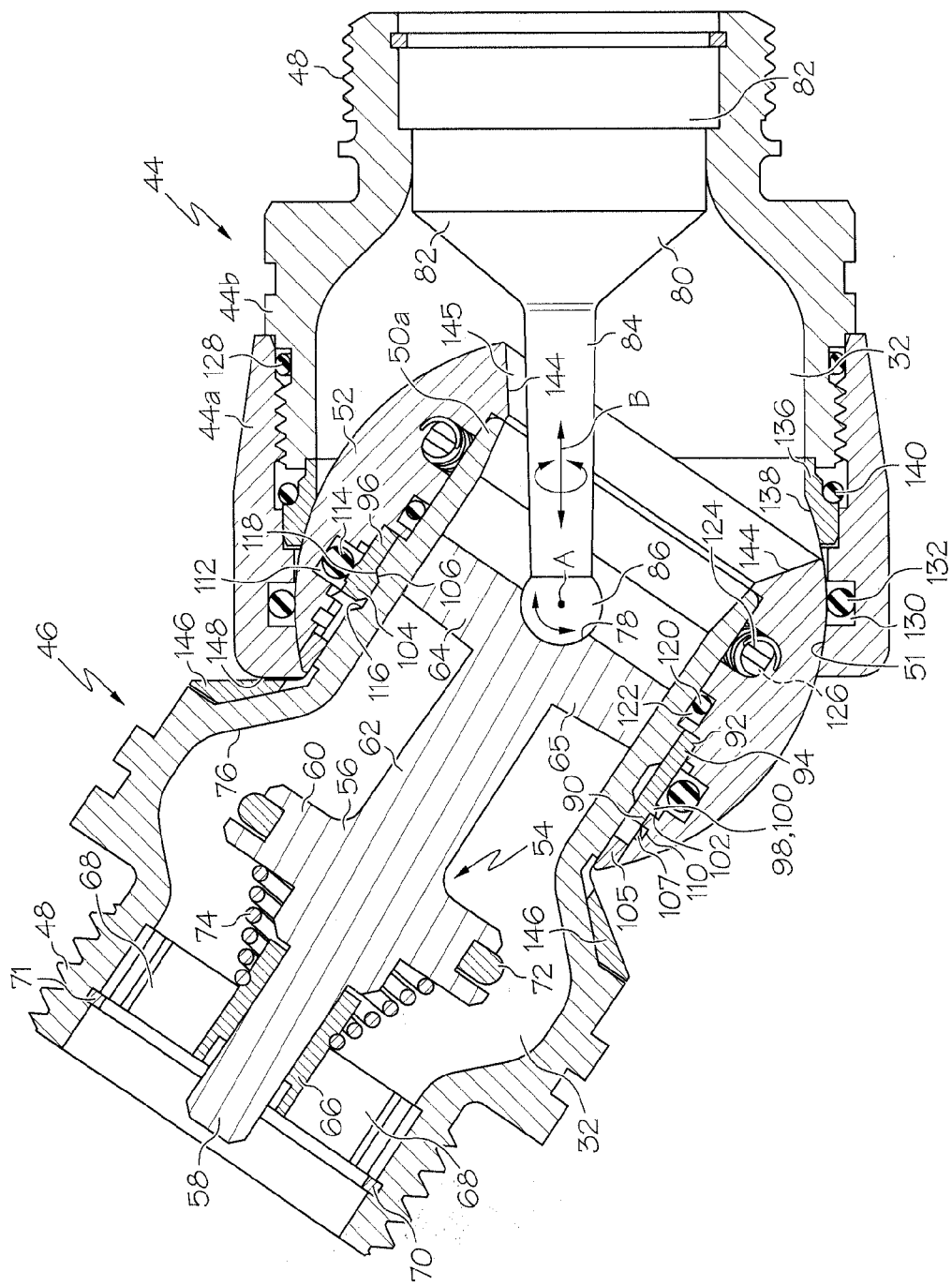
FIG. 4 is a side cross section of the breakaway connector of FIG. 2, with the housing and spud at an angle.

As shown in FIGS. 2-4, the coupling ring 90 is received in cylindrical inner recess of the ball 52. In particular, the coupling ring 90 is secured such that each locking tab 98 of each securing flange 94 is received in an upstream groove 103 of the ball 52. The locking surface 102 of the securing flanges 94 extend generally perpendicular to the associated surface of the upstream groove 103 to thereby lock the coupling ring 90 in place. The securing flanges 94 thereby secure the coupling ring 90 in place such that the coupling ring 90 is permanently and non-removably secured in the ball 52, and such that the coupling ring 90 cannot be removed without causing damage to the coupling ring 90 or some other component. In one case, the coupling ring 90 has a scarf cut 91 extending therethrough, lending a split ring shape to the coupling ring 90.

The scarf cut 91 enables the coupling ring 90 to be compressed into a smaller diameter during insertion into the ball 52, before snapping into place into the groove in the ball 52. The scarf cut 91 also enables the coupling ring 90 to be removed, as it can be overlapped with itself in the radial direction to shrink its effective radius and enable easier extraction. The coupling ring 90 may, in one embodiment, lack a scarf cut 91, in which case the coupling ring 90 may be considered to be more permanently mounted, and may not be able to be removed without damaging the coupling ring 90.

An external press-fit guide bushing 105 may be received in the ball 52 to further trap the coupling ring 90 in place, provide a smooth-finish surface to the ball 52 and protect the internal components of the breakaway connector 42 from fluids, corrosive chemicals, debris and the like. The guide bushing 105 may include a number of flanges 107 received in a guide bushing groove 110 of the ball 52 to retain the guide bushing 105 in place. However, the bushing 105 is optional and may be omitted, particularly if the coupling ring 90 is sprung into place, as aided by the scarf cut 91, and/or retained in place by other features.

The ball 52 includes a groove 112 which receives a deformable, elastic resilient element, such as an O-ring or the like 114, therein. Each releasable flange 96 is positioned adjacent to (i.e. and radially inwardly, in the illustrated embodiment) the resilient element 114. The coupling portion 50 of the spud 46 includes a groove 116 extending circumferentially thereabout, and the downstream surface of the groove 116 is defined by an angled/chamfered engagement surface 118 (see FIG. 3). In the illustrated embodiment, the angled surface 118 is formed at the same angle (i.e. within about five degrees in one case) as the angled surface 106 of each releasable flange 96 such that the angled surfaces 106, 118 are in facial abutment when the connector 42 is assembled, as shown in FIGS. 2 and 4.

The engagement between the angled surfaces 106, 118 locks the housing 44 in place with respect to the spud 46, due to interference/frictional forces of the angled surfaces 106, 118. In some cases, the resilient element 114 may bias the releasable flanges 96 radially inwardly to increase the coupling force between the surfaces 106, 118.

When sufficient axial separation forces are applied to the housing 44 and/or spud 46, the angled surfaces 106, 118 slide along each other, causing the releasable flanges 96 to be urged radially outwardly, thereby compressing or further compressing the resilient element 114. Sufficient axial forces cause sufficient radially outward deflection of the releasable flanges 96 that the angled surfaces 106, 118 slide by each other in the axial direction, and the housing 44 is pulled away from the spud 46, thereby moving the connector 42 to its separated state or condition shown in FIG. 3

As noted above, the engagement between the angled surfaces 106, 118 determines, at least in part, the axial force required for separation of the connector 42. The angle and surface characteristics of the angled surfaces 106, 118 can be selected to provide the desired separation characteristics. Moreover, the number and shape of releasable flanges 96, and the nature, size, shape, and materials of the resilient element 114 can be selected to provide desired separation characteristics. For example, the greater the total circumferential length of the angled surfaces 106, the greater the frictional engagement with the angled surface 118, thereby increasing the overall separation force.

A relatively stiff, large diameter resilient element 114 used in conjunction with a relatively high number of low-lubricity flanges 96 can lead to higher separation forces required to separate the connector 42. Conversely, a relatively pliable, small diameter resilient element 114 used in conjunction with a relatively low number of high-lubricity flanges 96 can lead to lower separation forces. The desired separation force can vary according to the needs of the end-user, but one case varies between about 100-400 lbs., and is about 285 lbs. in one case.

The pre-compression (if any) of the resilient element 114 can be determined by the depth of the groove 112, the shape of the resilient element 114, as well as the shape of the protrusion 108 positioned on the outer surface of the releasable flanges 96. The use of the resilient element 114 enables the separation force for the breakaway connector 42 to be easily modified or customized, simply by changing the resilient element 114, to meet region-specific requirements or the like. The resilient element 114 may be compressed/deformed (either pre-compressed/deformed or compressed/deformed during separation) or compressible/deformable by at least about $\frac{1}{64}$" in one case, or at least about $\frac{1}{32}$" in one case, or at least about $\frac{1}{16}$" in another case, or at least about $\frac{1}{8}$" in another case, or at least about 0.25 mm, or at least about 0.5 mm, or at least about $\frac{1}{60}$ of the radius of the resilient element 114, or at least about $\frac{1}{30}$ of the radius of the resilient element 114, or at least about the depth of the groove 116, to provide the necessary clearance to allow the releasable flanges 96 to be removed out of the groove 116.

In some cases, the downstream end 50a of the coupling portion 50 and the inner volume of the ball 52 which receives the downstream end 50a therein may have corresponding, eccentric (i.e. non-circular) shapes. For example, in one case, outer surface of the downstream end 50a and the corresponding inner cavity of the ball 52 may each be octagonal in cross section (the remainder of the spud 46 may be generally cylindrical). The use of such eccentric shapes helps to ensure that any rotation of the connector 42 occurs at the junction of the ball 52 and its socket 51 to avoid damaging the coupling ring 90. In particular, if the connecting portion 50 were to spin inside the ball 52, the connecting portion 50 could cause the flanges 96 to wear down, which would adversely effect the performance of the flanges 96 and reduce the separation force. The coupling ring 90 may be circular, as shown in FIG. 5, and the scarf cut 91 may enable the coupling ring 90 to fit over the octagonal downstream end 50a during installation.

The separation point of the connector 42 (i.e. at the interaction between the angled surfaces 106, 118) is positioned inside (i.e. axially overlaps with) the ball 52, and radially outside the ball portion 86/socket portion 78. This arrangement ensures that the separation point inside the ball 52 (i.e. the angled surface 106/flange 96) is protected from external forces after separation, as can be seen in FIG. 3. In addition, the coupling ring 90, and its flanges 94, 96, is positioned inside the ball 52, and is therefore protected from damage (i.e. after a separation event). In other words, because the flanges 94, 96 are positioned in a female member (the ball 52 in this case), the flanges 94, 96 are protected, even after separation. In this configuration the outer surface of the ball 52 and its associated socket 51 are also both protected, and the connector 42 has a smaller profile and greater sealing characteristics.

The resilient element or O-ring energizer 114 also provides stability and a consistent separation force. In particular, the shape and properties of the resilient element 114 can be more easily controlled, as compared to use of the flanges 94, 96 alone. The resilient element 114 may be made from a material which is thermally stable, and which can retain its resilient properties at a low temperature (down to −65° F. in one case) to reduce the effects of temperature upon separation performance of the connector 42. In addition, the use of the resilient element 114, instead of a spring or the like, reduces the overall size of the connector 42, reduces costs, and increases repeatability.

A sealing member, such as an O-ring 120 or the like, can be received in a groove 122 of the ball 52, and positioned between the ball 52 and the spud 46, to seal those components when the connector 42 is in its connected configuration. In addition, the connector 42 may include a wave spring 124, in the form of a Marcel expander, positioned in a groove 126 of the ball 52. The Marcel expander 124 has an irregular shape and may be made of an electrically conductive material, such as metal. In this manner, the Marcel expander 124 helps to ensure electrical connection between the spud 46 and housing 44 to ensure those components remain grounded to avoid buildup of static electricity forces. Various other components, besides a Marcel expander, may be used as the spring/component 124, such as a canted coil or a coil spring. The wave spring 124 may be able to be omitted when sufficient contact between the ball 52 and spud 46 is ensured such as, for example, when the connecting portion 50 of the spud 46 has an eccentric (e.g. octagonal) shape.

The ball 52/socket 51 can have a variety of sizes of radius, such as between about ½" and about 1", more particularly about ¾" in one case. If the ball 52/socket 51 is made too large, then the maximum angle of rotation of the connector 42 may be increased, but the connector 42 becomes too large and unwieldy. In contrast, if the radius of the ball 52/socket 51 becomes too small, the fluid flow path 32 through the connector 42 may become too small, leading to restricted fluid flow. The ball 52, or at least its outer surface, can be made of a variety of materials, including aluminum, stainless steel, or other metal or plastics. The ball 52 may have a plating, such as a nickel-based plating thereon. The materials may be selected to reduce weight and costs, but lowering friction (to reduce binding) and increasing durability (decreasing chances of galling) should also be considered.

The illustrated housing 44 includes first 44a and second 44b housing portions which are threadably connected together with a seal 128 therebetween. Alternately the housing 44 can be a single unitary part. The first housing portion 44a includes a generally spherical inner surface forming the socket 51 which closely and slidably receives the ball 52 therein. The socket 51 includes a groove 130 which receives a seal 132 in the form of a quad-seal O-ring, U-cup or other sealing member to seal with the outer surface of the ball 52. An internal bushing 136, which can be made of metal or other material, is positioned within the housing 44, and includes a spherical inner surface 138 closely receiving or engaging the ball 52. An optional wave-ring spring 140 or the like may be positioned between the internal bushing 136 and the housing 44 and placed in axial compression such that the spring 140 biases the internal bushing 136 into contact with the ball 52. The wave ring spring 140 and internal bushing 136 thereby helps to maintain the position of the ball 52, and also provides a conductivity path within the connector 42.

The ball 52/socket 51 and ball portion 86/socket portion 78 enable the housing 44 to pivot and rotate relative to the spud 46. In particular, as shown in FIG. 4, the housing 44 may be pivotable, relative to an axis A extending perpendicular to the central axis of the connector 42/spud 46/housing 44. In the illustrated embodiment, the housing 44, and spud 46 are pivotable relative to each other about axis A about 35 degrees from the position shown in FIG. 2 wherein the housing 44 and spud 46 are axially aligned; thus, the connector 42 may have a full angle pivot capability of about 70 degrees. However, the pivot range of the connector 42 can be varied as desired, and, in one case, may have a full angle rotation capacity of at least about fifty degrees (i.e. with a half angle rotation capacity of at least about twenty five degrees) which may provide sufficient range of motion. If desired, the position of the socket portion 78 and ball portion 86 may be reversed such that, for example, the socket portion 78 is located on the hold-open stand 80 and the ball portion 86 is carried on the guide 64. Moreover, if desired, the position of the ball 52/socket 51 and sleeve 50 may be reversed such that the ball 52/socket 51 is carried on the spud 46, and the sleeve 50 is carried on the housing 44.

As can be seen in comparing FIGS. 2 and 4, when the housing 44 is pivoted relative to the spud 46, the ball 52 is guided smoothly within the socket 51 to allow free pivoting thereof. Moreover, at the same time the ball portion 86 is freely pivoted within the socket portion 78. Accordingly, both the ball 52/socket 51 and the ball portion 86/socket portion 78 should have a common center (at axis A) to enable a smooth pivoting movement of the housing 44 and spud 46. The common centers also help to minimize the potential binding of the breakaway connector 42 in various offset positions. The centers may be made as coincident as possible and, in one case, are located within 5%, or within 1%, of the radius of the ball 52.

In addition, the housing 44 is rotatable relative to the spud 46. In particular, in one case the housing 44 can be spun or rotated 360° (or more) about the central axis B (FIGS. 2 and 4) of the housing 44/spud 46/connector 42, regardless of the relative positions of the housing 44/spud 46. As the housing 44 is rotated, the socket 51 slides about the ball 52, and the ball portion 86 slides within the socket portion 78. Moreover, the rotation (about axis B) and pivoting (about axis A) of the connector 42 can occur simultaneously. Accordingly, the rotational and pivotable motion of the connector 42 provides significant freedom of motion to a user of the associated dispenser 12, and somewhat mirrors the wrist or shoulder movement of the user. In particular, the user can move the nozzle 18/hose 16 to any of a wide variety of positions, and the connector 42 naturally accommodates such motion in a relatively frictionless manner such that the user can easily position the nozzle 18/hose 16 as desired.

In addition, the connector 42 continues to operate and provide its breakaway capabilities, even when in its fully pivoted position (or other positions), as shown in FIG. 4. In particular, the hold-open stand 80 continues to keep the poppet 54 open such that fluid can flow through the connector 42. In the case of a drive-away event, the connector 42 can separate, even when the spud 46 and housing 44 are at an angle. The ball-and-socket arrangement(s) ensures that, even when the spud 46 and housing 44 are at an angle, the separation forces applied at the point of separation (i.e. where the angled surfaces 106/118 engage each other) is applied only axially. In this manner, the connector 42 can separate when in a variety of positions in a consistent and repeatable manner.

The ball 52 may include a downstream outwardly angled or chamfered surface 144. The chamfered surface 144 helps to ensure that the hold-open stand 80 does not engage the ball 52 when the connector 42 is moved to its maximum pivoted position, as shown in FIG. 4. The chamfered surface 144 is designed such that there is a gap or clearance 145 between the chamfered surface 144 and the hold-open stand 80 when the connector 42 is in its maximum pivoted position, to ensure that those components do not limit the rotational movement of the connector 42. In particular, in one embodiment, when the housing 44 and spud 46 are designed such that the connector 42 can assume a maximum pivoted angle of 35 degrees, the hold-open stand 80 and chamfered surface 144 may be arranged such that they can accommodate a maximum rotation of 38 degrees, to ensure the desired clearance.

In one illustrated embodiment, the spud 46 may include an outer bushing 146 made of an impact-resistant material, such as nylon or the like, to protect the spud 46 and connector 44 when the housing 42 is attempted to be moved beyond its maximum pivoted position, as shown in FIG. 4. The bushing 146 may be formed at an angle to match the angle of the head 148 of the housing 44 when the housing 44 is at its maximum pivoted position. The outer bushing 146 is thus angled to provide a plane-to-plane contact between the bushing 146 and the housing 44 to avoid dents and deflections in the outer bushing 146 and housing 44, which could lead to binding of the breakaway connector 42 at particular angular positions. The outer bushing 146 also absorbs energy and protects against the potential creation of any sparks. The connector 42 is thus configured to reduce damage thereto when the connector 42 is moved to (or attempted to be moved beyond) its maximum pivoted position. The outer bushing 146 is optional and may be used when demanding wear conditions are expected.

Thus, the breakaway connector 42 provides great flexibility to the user, enabling the nozzle 18/hose 16 to be positioned at any of a wide variety of positions relative to the dispenser 12 or upstream portions of the hose 16. In addition, since the breakaway connector 42 is movable to a variety of configurations and positions, even during break-away events, the system does not require a whip hose or the like. The breakaway connector 42 can also be located at various positions within the system 10, as shown in FIG. 1 and described above. As noted above, the breakaway connector 42 is also easily manually re-connectible without requiring the repair or replacement of any parts, as no parts are destroyed or damaged during normal separation. The re-connectible configuration means that the breakaway connector 42 can be tested prior to shipping, in contrast to non re-connectible, one-time use breakaway connectors which cannot be tested as easily.

Figure 6:
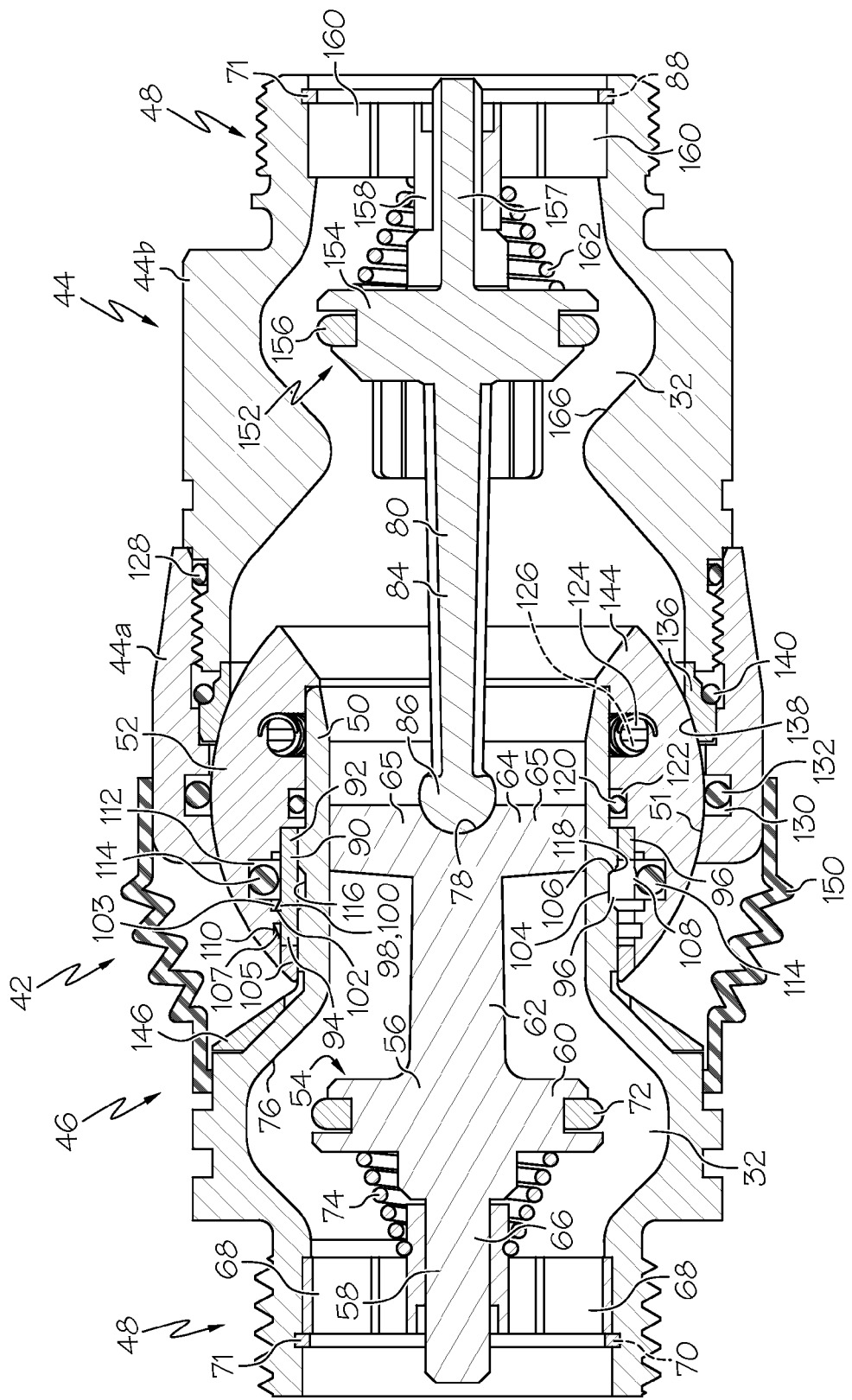
FIG. 6 is a side cross section of a second embodiment of the breakaway connector, shown in its connected configuration.
Figure 7:
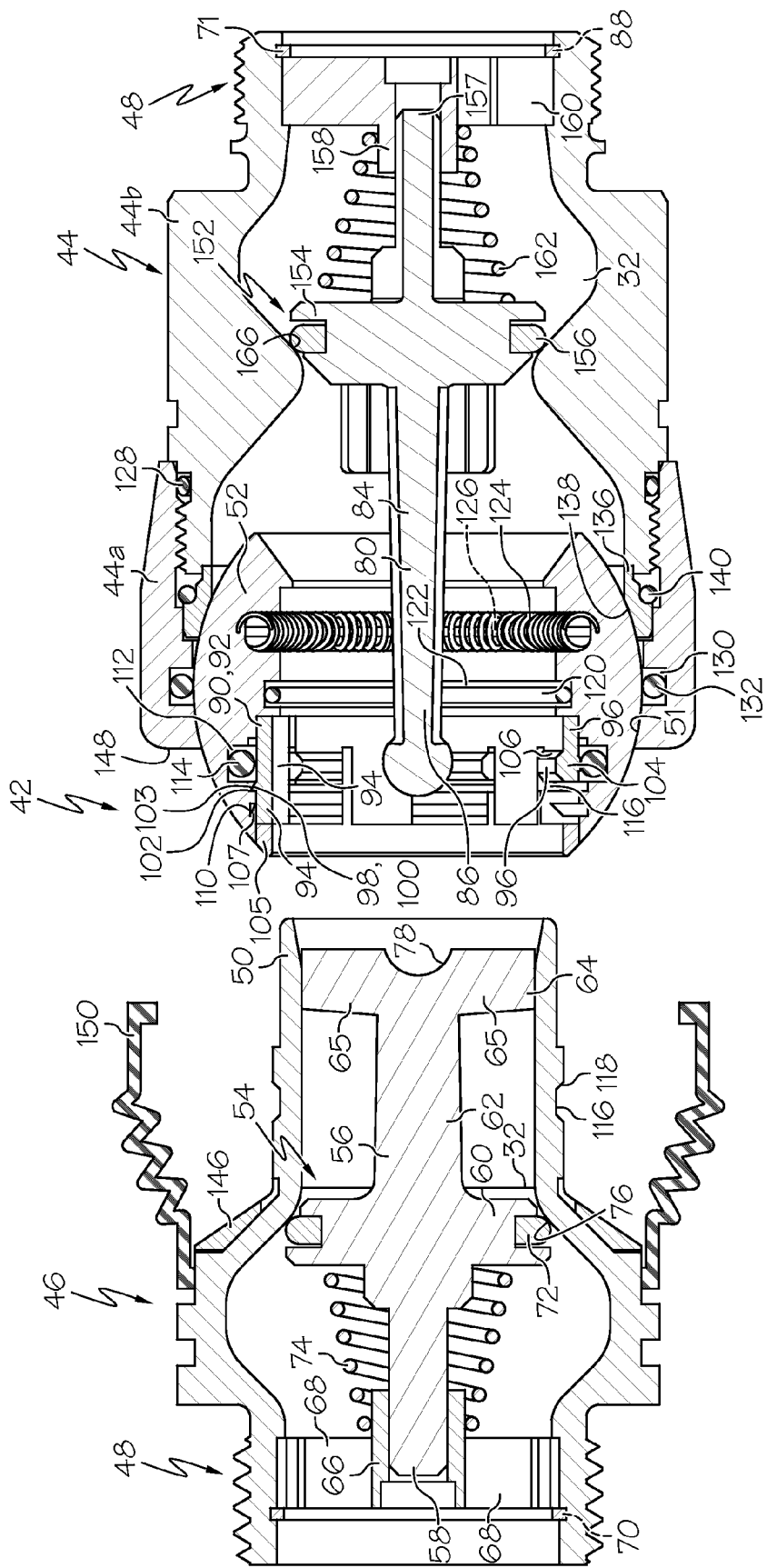
FIG. 7 is a side cross section of the breakaway connector of FIG. 6, shown in its disconnected configuration.
Figure 12:
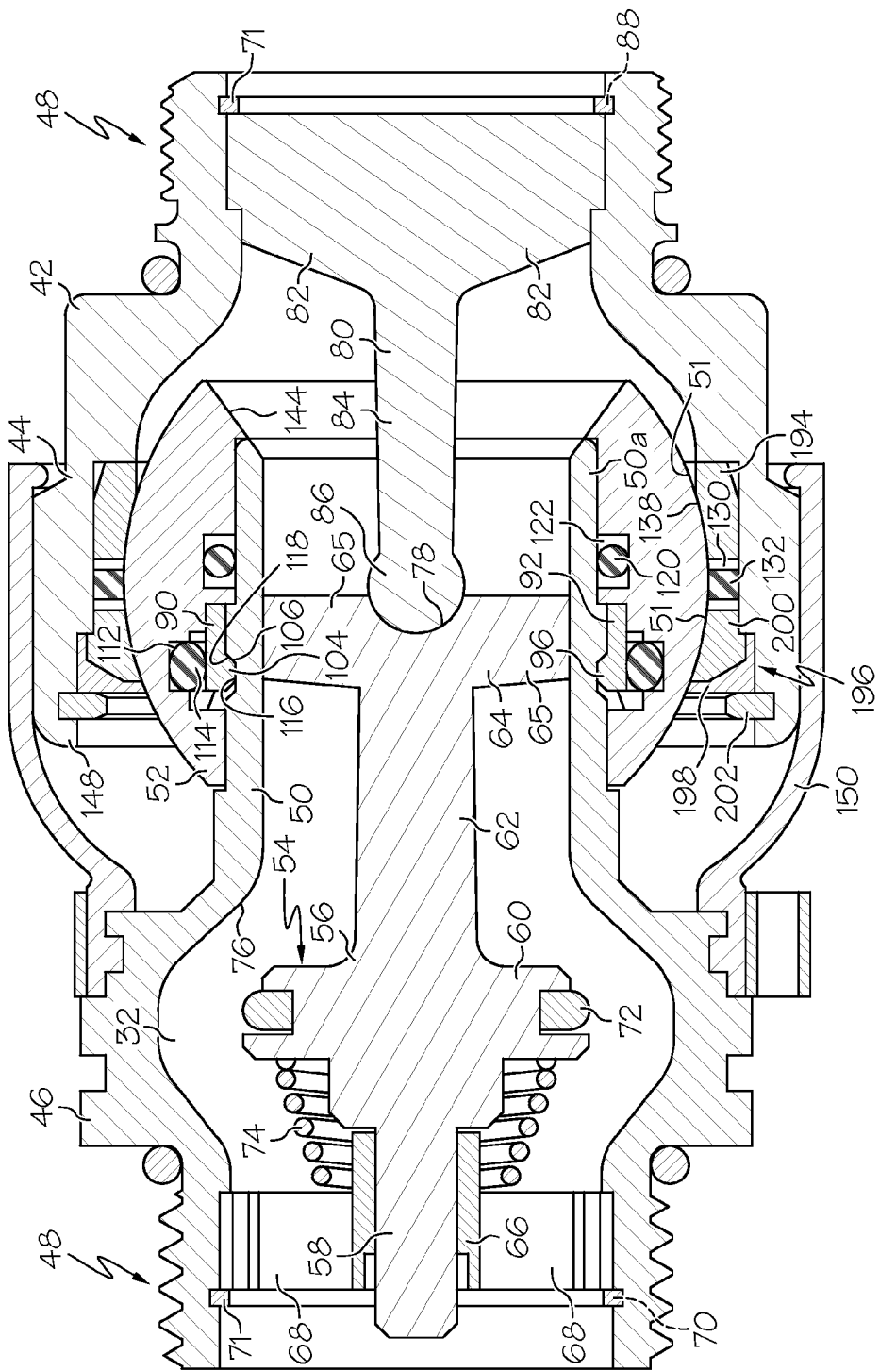
FIG. 12 is a side cross section of another embodiment of the breakaway connector, shown in its connected configuration.

The embodiment of FIGS. 6 and 7 includes a flexible bellows 150 coupled to the spud 46, and extending over the exposed portions of the ball 52 and part of the housing 44 (see also FIG. 12). The bellows 150 helps to protect the ball 52, prevent contamination, and prevents dirt and debris from entering into the ball 52/socket 51/connector 42. In the illustrated embodiment, the bellows 150 is fixedly coupled to the spud 46, and slidably fits over the housing 44. In this manner, when the connector 42 is separated, as shown in FIG. 7, the bellows 150 remains coupled to the spud 46. In addition, after a separation event, the bellows 150 extends axially forwardly of the cylindrical portion 50. In this manner the bellows 150 helps to protect the exposed cylindrical portion 50 after separation to prevent or minimize damage to the cylindrical portion 50. Although the bellows 150 is shown in conjunction with the embodiment of FIGS. 6 and 7, the bellows 150 can be used with any of the embodiment shown herein.

FIGS. 6 and 7 illustrate a second embodiment of the breakaway connector 42. In particular, in the second embodiment, the housing 44 includes a poppet valve 152 positioned therein, and positioned to selectively block fluid from flowing through the fluid flow path 32. In particular, the poppet valve 152 includes a poppet body 154 carrying a seal 156 thereon. The body 154 has a downstream stem 157. The hold-open stand 80 is coupled to, and extends at axially upstream relative to, the body 154.

The stem 157 is received in a generally cylindrical guide 158 which is centered in the housing 44 by a plurality of radially-extending fins 160. The guide 158 is axially held inside the housing 44 by the retaining ring 71 in the groove 88. The poppet valve 152 further includes a spring 162 positioned on the downstream side of the body 154 such that the spring 162 is trapped between the guide 158 and the body 154.

During normal operation, the spud 42 and housing 44 are arranged in their first state or configuration, as shown in FIG. 6. The hold-open stand 80 engages the poppet valve 54, thereby compressing the spring 162 and keeping the poppet valve 152 in its open position.

When the breakaway connector 42 moves to its second, or separated configuration, as shown in FIG. 7, the hold-open stand 80 is separated from the poppet 54, thereby enabling the poppet valve 152 to move to its closed position, in which the seal 156 engages the poppet valve seat 166. Accordingly, this arrangement helps to block or minimize loss of fluid from the downstream or nozzle-side of the dispenser 12.

When the connector of FIG. 7 is in its separated position, it can be moved to its connected position shown in FIG. 6 simply by sliding the spud 42 inside the connector 44 until the releasable flanges 96 are urged sufficiently radially outwardly, and then spring back radially inwardly as received in the groove 116. In addition, in this embodiment the spring 74 of the poppet 54 in the spud 46 may have a higher spring force (stiffness) than the spring 162 of the poppet valve 152 in the housing 44. In this manner, when the connector 42 is being assembled/re-assembled, the spring 162 of the poppet 152 in the housing 44 is first compressed to its solid state (i.e. fully compressed), or nearly solid state, so that the ball portion 86 can be more easily manipulated and properly position in the socket portion 78. This feature provides easier and more consistent coupling of the connector 42.

When the connector of FIGS. 6 and 7 is moved to its fully pivoted position (i.e. similar to that shown in FIG. 4), it can be seen that the springs 74, 162 would be axially offset from each other, thereby reducing their effective forces acting on each other due to the vector nature of the spring forces. Thus, the springs 74, 162 should be made sufficiently strong/stiff that they can still both apply a sufficient force to the poppets 56, 152, even when in the fully pivoted position. Thus, the spring constants for the one or both of the springs 74, 162 may need to be increased by, for example, about 40% over the spring constants for springs used in linear-type systems.

However, rather than increasing the spring constants for both springs 74, 162, one of the springs (i.e. spring 162 of poppet 152) can be designed to be relatively weak or have a smaller preload such that it achieves its solid state, or nearly solid state, during use, as described above. In this case the spring 74 can float and has a higher spring force to push the poppet 152 fully open. The unequal spring forces can be implemented by using differing springs, by using differing numbers of springs, or by using differing spring preload conditions.

Figure 8:
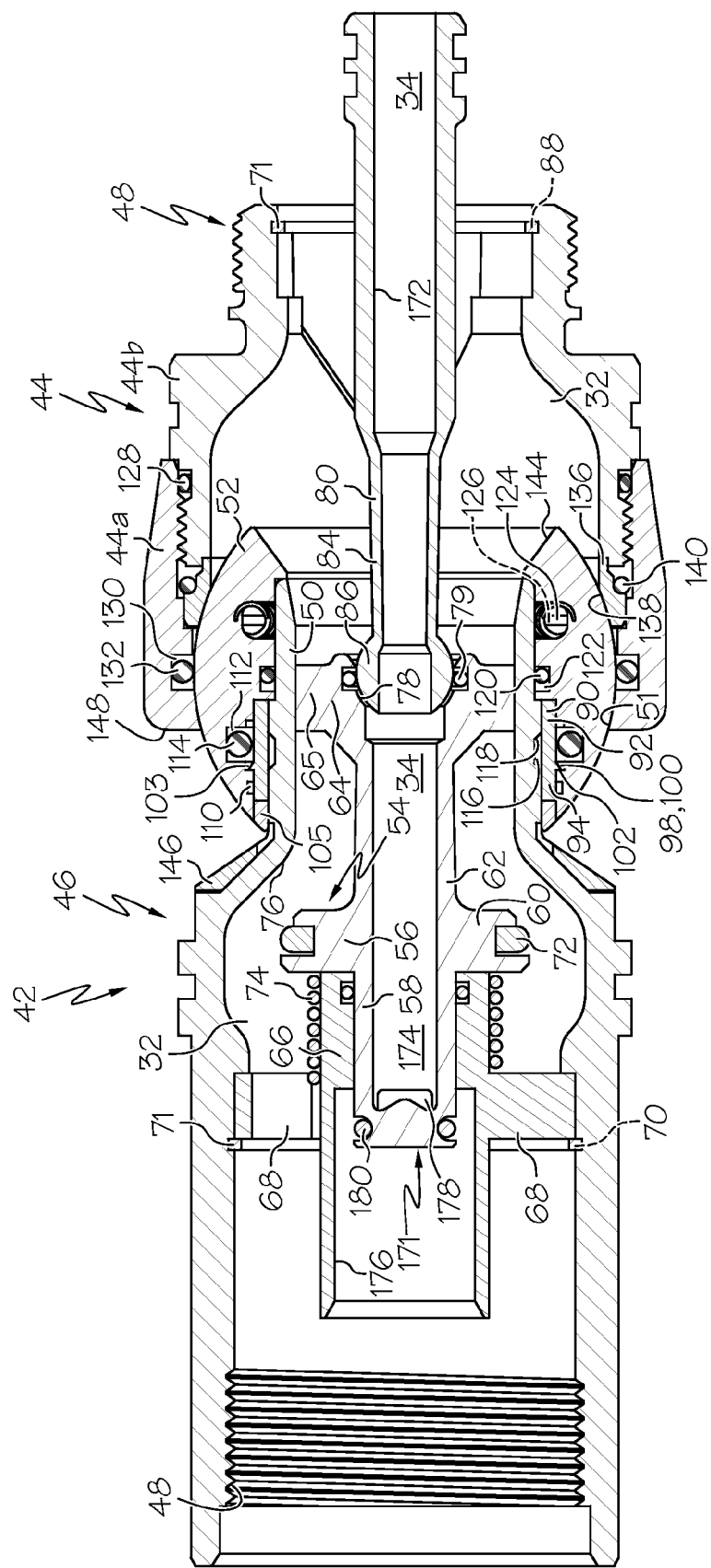
FIG. 8 is a side cross section of a third embodiment of a breakaway connector, shown in its connected configuration.
Figure 9:
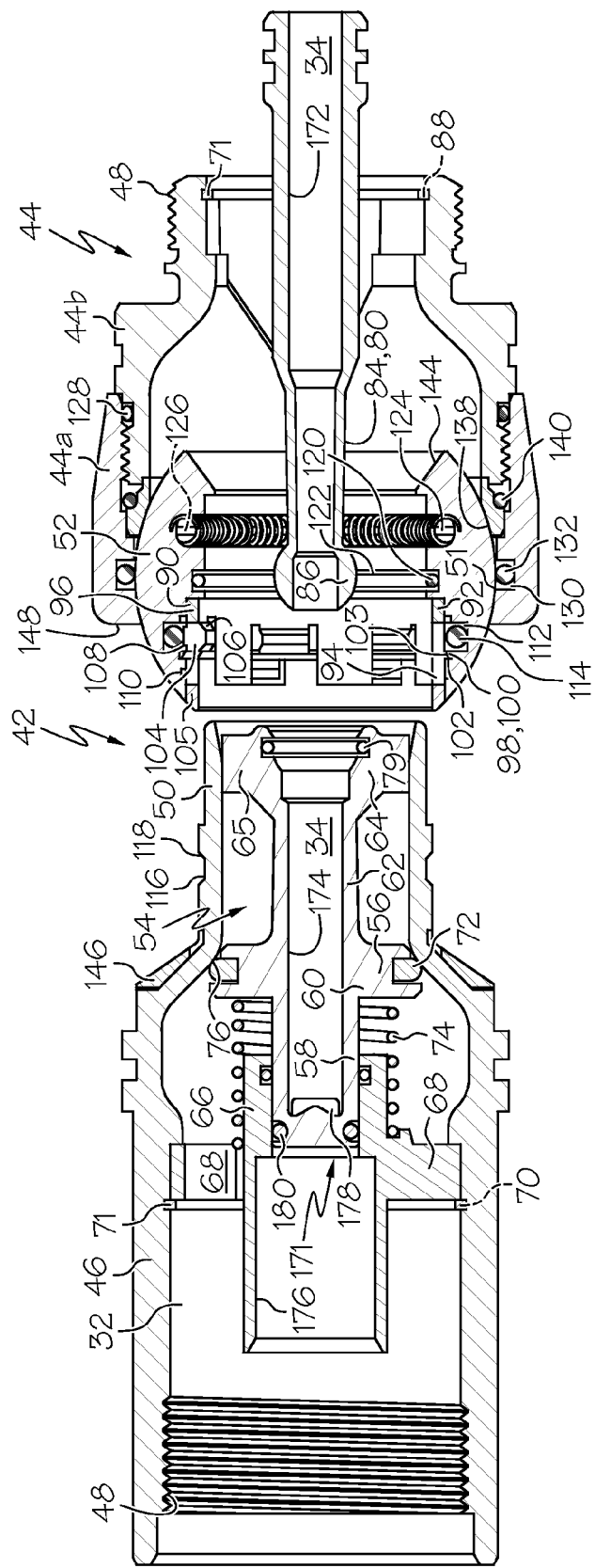
FIG. 9 is a side cross section of the breakaway connector of FIG. 8, shown in its disconnected configuration.
Figure 10:
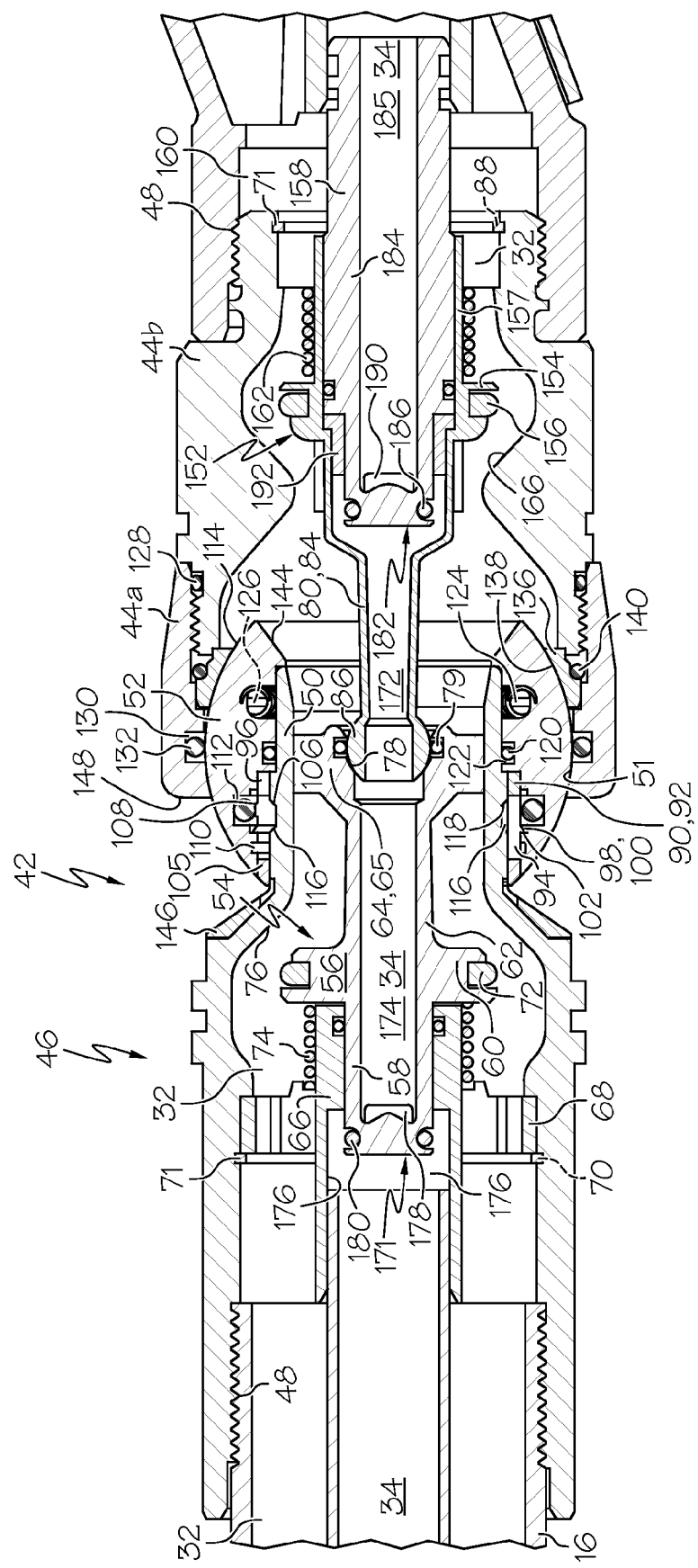
FIG. 10 is a side cross section of a fourth embodiment of a breakaway connector, shown in its connected configuration and coupled to a hose and a nozzle.

FIGS. 8 and 9 illustrate a third embodiment of the breakaway connector 42. In this embodiment, the connector 42 includes a vapor path 34 formed therein to transmit recovered vapors from the vehicle to the storage tank 20 or elsewhere for recovery and capture, and a vapor control valve 171 is positioned therein. In particular, as can be seen, the hold-open stand 80 includes an axially-extending opening 172 formed therein, and the poppet 54 of the spud 42 also includes an axially-extending opening 174 therein. The upstream guide 66 of the poppet 54 includes an axially-extending opening 176 that closely receives poppet stem 58 therein. The openings 172, 174, 176 thereby define, or are a part of, the vapor path 34 of the system. In particular, the downstream end of the opening 172 of the hold-open stand 80 may be fluidly coupled to the vapor recovery path by hose 16/nozzle 18, and the upstream end of the opening 176 of the guide 66 may be fluidly coupled to a vapor path 34/conduit 36 of the hose 16, dispenser 12 or the like, as shown in FIG. 10. The socket portion 78 may include an O-ring or the like 79 therein to aid in sealing the vapor path 34.

The poppet stem 58 includes a radially-extending opening 178 formed therein. When the connector 42 is in its connected configuration, as shown in FIG. 8, the radially-extending opening 178 is in communication with the opening 176 of the poppet guide 66, thereby enabling vapor flow therethrough. In contrast, when the connector 42 is in its disconnected state, as shown in FIG. 9, the poppet stem 58 and opening 178 move in the downstream direction such that the opening 178 is positioned within a closely-fitting portion of the poppet guide 66, thereby effectively sealing the opening 178 and blocking the flow of vapor therethrough. Seal 180 is also provided at the axial end of the poppet stem 58 to seal the opening 174/vapor path 34 when the vapor control valve 171 is in its closed position. Thus, in the embodiment shown in FIGS. 8 and 9, the vapor path 34 within the spud 42 is sealed after a separation event by the vapor control valve 171, thereby preventing or minimizing the escape of vapors from the dispenser 12/storage tank 20.

Figure 11:
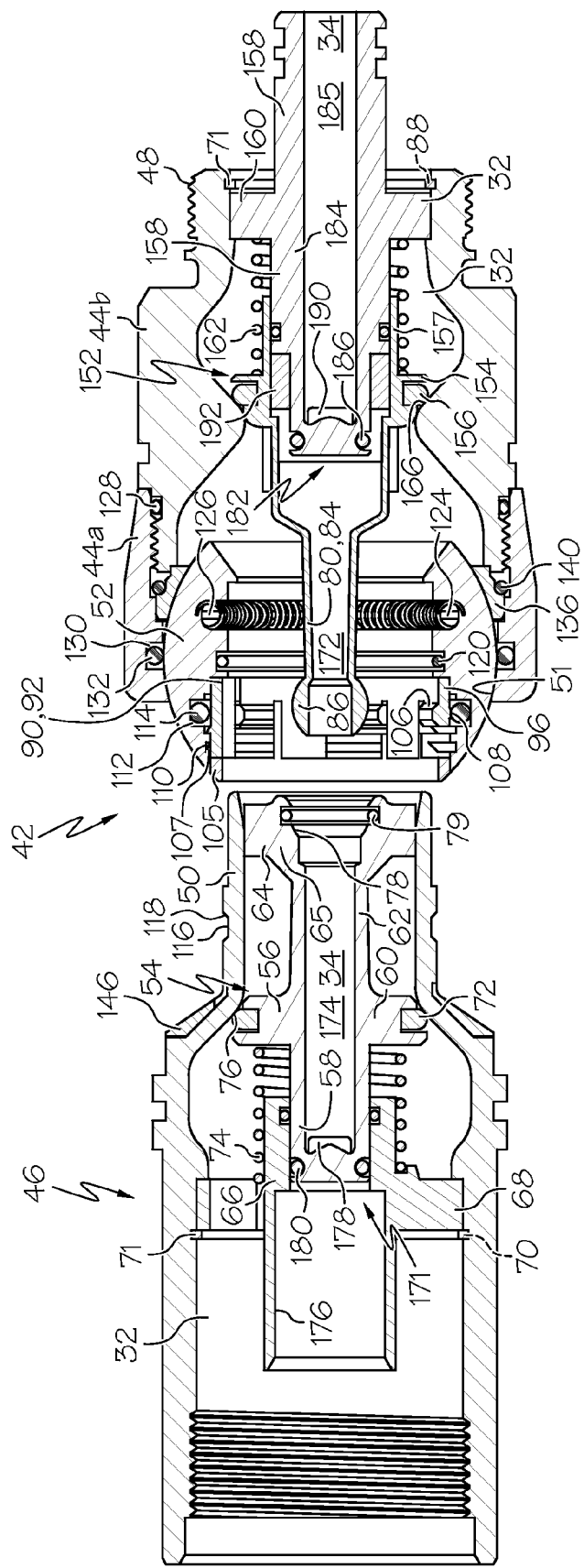
FIG. 11 is a side cross section of the breakaway connector of FIG. 10, shown in its disconnected configuration.

FIGS. 10 and 11 illustrate a fourth embodiment of the breakaway connector 42. This embodiment is similar to the embodiments shown in FIGS. 8 and 9 in which both the housing 44 and spud 46 have vapor flow paths 34 defined therethrough. However, in the embodiment shown in FIGS. 10 and 11, the housing 44 has a vapor control valve 182 positioned therein. The vapor control valve 182 includes a support 184 defining an inner cavity 185 and carrying an O-ring 186 thereon. The support 184 has a radially-extending opening 190 formed therein. A sealing collar 192 is positioned between the O-ring support 184 and the hold-open stand 80, and closely receives the support 184 therein During normal operation, as shown in FIG. 10, the O-ring 186 and opening 190 are spaced away from an end of the sealing collar 192, and vapor can flow through the hold-open stand 80, the opening 190 and the inner cavity 185 of the stand 184. When the connector 42 moves to its separated state, as shown in FIG. 11, the hold-open stand 80 and the sealing collar/ring 192 move axially in the upstream direction. When in this position the O-ring 186 and opening 190 are closely received in the sealing collar 192, thereby blocking the vapor flow path 34 through the housing 44. In this manner, the embodiment shown in FIGS. 10 and 11 the vapor control valve 182 seals the vapor flow path 34 in the housing 44 after a separation event, thereby minimizing the escape of vapor from the downstream/nozzle end of the dispenser 12.

FIG. 12 illustrates another embodiment including features which can be included in any of the embodiments described above and shown herein. In the embodiment of FIG. 12, the housing 44 is made from a single, unitary piece of material, instead of the two pieces 44a, 44b described above. The use of a single-piece housing 44 may provide ease of manufacture, avoids the chances of separation of the two pieces 44a, 44b, and removes an additional potential leakage path.

In the embodiment of FIG. 12 the bushing 136 and spring 140 are replaced with an idler bearing 194 which has an inner spherical seat 138 forming at least part of the socket 51. The bearing 194 can be made of a high lubricity material, such as polymers, plastics or the like. In this case, the wave spring 140 may not be used, and the bearing 194 may instead be biased into contact with the ball 52 solely by hydraulic forces of fluid flowing through the fluid flow path 32. The fact that the bearing 194 is not mechanically biased into contact with the ball 52 and the high lubricity of the bearing 194 helps to reduce friction and ensure smooth movement of the ball 52 within the socket 51. The bearing 194 also helps to protect the ball 52 from damage during assembly of the connector 42. The bearing 194 provides electrical conductivity between the housing 44 and the ball 52. The conductivity is increased during operation of the connector 42, as fluid pressure further urges the bearing 194 against the ball 52.

In the embodiment of FIG. 12, the upstream end of the socket 51 (located at the distal end of the housing 44), is provided by a bearing 196 including a raceway 198 fixedly coupled to the housing 44 and a ring 200 rotatably received in the raceway 198. The radially inner surface of the ring 200 is spherical forming part of the socket 51, and receives the ball 52 therein. The use of the bearing 196 enables accommodation of greater manufacturing tolerances in the manufacturing of the housing 44 and greater precision in manufacturing of the socket 51/inner surface of the ring 200. The raceway 198 may be press fit into the housing 44, and a snap ring 202 may be positioned adjacent to the raceway 198 to retain the raceway 198 in place, particularly during a separation event of the connector 42.

The bearing 196 transmits spinning frictional forces to the interface of the ring 200 and raceway 198 where such frictional forces can be more easily accommodated, thereby reducing friction and increasing the life of the connector 42. The bearing 196 thus is designed to take loads and wearing forces with reduced risk of fatigue or wearing out, as compared to when such loads are applied to the housing 44. In the embodiment of FIG. 12 the housing 44 does not form any of the socket 51, and such isolation thereby provides better structural integrity to the housing 44. While FIG. 12 illustrates the bearing 196 in the form of a plain bearing, the use of roller bearing, ball bearing or the like may also be utilized.

Thus the connector 42 described herein allows a consistent and easily adjustable separation force, a protected separation point/area, enables pivoting of the connector 42 to various positions for ease of use while still enabling consistent separation, can be used in a variety of configurations, and enables sealing of fluid and/or vapor paths at a variety of positions within the connector 42.

Having described the invention in detail and by reference to certain embodiments, it will be apparent that modifications and variations thereof are possible without departing from the scope of the invention.

What is claimed is:

1. A breakaway assembly comprising:
a first connector including a ball portion movably received therein;
a second connector including a coupling portion, wherein said assembly is movable between a first configuration in which said coupling portion is received in said ball portion and said first and second connectors together define a fluid path through which fluid may flow, and a second configuration in which said coupling portion is not received in said ball portion, and wherein said assembly is configured to move from said first configuration to said second configuration when a sufficient separation force is applied to said assembly; and
a valve positioned in one of said first or second connectors, wherein said valve is configured to be in an open position when said assembly is in said first configuration to allow fluid to flow therethrough, and to move to a closed position when said assembly moves to said second configuration to generally block the flow of fluid therethrough.

2. The assembly of claim 1 wherein said coupling portion includes an angled surface thereon and said assembly includes an angled surface positioned in said ball portion, and wherein said angled surfaces frictionally engage each other to generally retain said assembly in said first configuration until a sufficient axial separation force is applied to said assembly.

3. The assembly of claim 2 wherein said angled surface of said coupling portion is a chamfered surface extending circumferentially thereabout, and wherein the assembly further includes a locking ring positioned in said ball portion, said locking ring including a plurality of axially-extending, radially-deflectable flanges, each flange carrying an angled surface.

4. The assembly of claim 3 wherein said flanges are configured to be deflected radially outwardly upon the application of said sufficient separation force to allow said assembly to be moved to said second configuration.

5. The assembly of claim 1 wherein said connectors are directly coupled together when said assembly is in said first configuration, and wherein said connectors are uncoupled and spaced apart from each other when said assembly is in said second configuration.

6. The assembly of claim 1 wherein said ball portion has a generally spherical outer surface, and wherein said first connector has a socket portion with a generally spherical surface which movably receives said ball portion therein.

7. The assembly of claim 1 wherein said ball portion is rotatable three hundred and sixty degrees relative to said connector about a central axis thereof when said assembly is in said first configuration, and is pivotable at least about twenty five degrees about an axis perpendicular to said central axis when said assembly is in said first configuration.

8. The assembly of claim 1 wherein said ball portion is non-removably received in said first connector.

9. The assembly of claim 1 wherein said valve includes a poppet positioned in said second connector, said poppet being spring biased to said closed position, and wherein said first connector includes an extension which engages said poppet to retain said poppet in said open position when said assembly is in said first configuration.

10. The assembly of claim 9 wherein one of said extension or said poppet includes a generally spherical surface and the other one of said extension or said poppet includes an engagement surface which movably engages said spherical surface.

11. The assembly of claim 10 wherein said generally spherical surface and said engagement surface are both positioned axially and radially within said ball portion when said assembly is in said first configuration.

12. The assembly of claim 10 wherein said generally spherical surface, said socket and said ball portion all generally share a common center when said assembly is in said first configuration.

13. The assembly of claim 1 further comprising a supplemental valve positioned in the other one of said first or second connectors, wherein said supplemental valve is configured to be in an open position when said assembly is in said first configuration to allow fluid to flow therethrough, and to move to a closed position when said assembly moves to said second configuration to generally block the flow of fluid therethrough.

14. The assembly of claim 1 wherein when said assembly is configured such that when said assembly is in said first configuration said first and second connectors together define a vapor path through which vapor may flow, said vapor path being fluidly isolated from said fluid path, and wherein the assembly further includes a vapor valve positioned in one of said first or second connectors, wherein said vapor valve is configured to be in an open position when said assembly is in said first configuration to allow vapor to flow therethrough, and to move to a closed position when said assembly moves to said second configuration to generally block the flow of vapor therethrough.

15. The assembly of claim 14 wherein said vapor path is generally coaxial with said fluid path.

16. The assembly of claim 14 wherein said vapor valve includes a sealing member and a vapor valve seat, and wherein said sealing member is positioned downstream of said valve seat, relative to the direction of vapor flow, when said vapor valve is in said open position.

17. The assembly of claim 1 wherein one of said first and second connectors is fluidly coupled to a fuel dispensing nozzle for dispensing fuel into an automobile fuel tank, and wherein the other one of said first and second connectors is fluidly coupled to a fuel pump.

18. The assembly of claim 1 wherein assembly is movable from said first configuration to said second configuration such that said first and second connectors are axially separated when a sufficient separation force is applied to said assembly, after which said first and second connectors are reattachable to configure said assembly in said first configuration without requiring any repair or replacement of any components of said assembly.

19. The assembly of claim 1 wherein said assembly is configured such that, when said assembly is in said first configuration, said fluid path extends generally axially entirely through said assembly such that fluid enters an upstream axial end of one of said connectors and exits a downstream axial end of the other one of said connectors.

20. A breakaway assembly comprising:
a first connector;
a second connector, wherein said assembly is movable between a first configuration in which said first and second connectors are coupled together at a coupling location and define a fluid path through which fluid may flow, and a second configuration in which said first and second connectors are not coupled together, wherein said assembly is configured to move from said first configuration to said second configuration when a sufficient separation force is applied to said assembly, and wherein said assembly includes a ball and socket joint which generally enables relative movement of said first and second connectors thereabout, and wherein said coupling location is positioned inside said ball and socket joint; and
a valve positioned in one of said first or second connectors, wherein said valve is configured to be in an open position when said assembly is in said first configuration to allow fluid to flow therethrough, and to move to a closed position when said assembly moves to said second configuration to generally block the flow of fluid therethrough.

21. The assembly of claim 20 wherein said first connector is rotatable generally relative to said second connector about a central axis of said assembly via said ball and socket joint, and wherein said first connector is pivotable generally relative to said second connector about an axis perpendicular to said central axis via said ball and socket joint.

22. A method for using a breakaway assembly comprising:
providing a breakaway assembly including a first connector having a generally spherical ball portion defining an inner volume and movably received therein and a second connector including a coupling portion, wherein said assembly is in a first configuration in which said coupling portion is received in said inner volume of said ball portion and said first and second connectors together define a fluid path through which fluid may flow, and wherein the assembly further includes a valve positioned in one of said first or second connectors, wherein said valve is in an open position to allow fluid to flow therethrough; and
upon the application of a sufficient separation force, allowing said assembly to move to a second configuration in which said coupling portion is not received in said inner volume of said ball portion and said valve is in a closed position to generally block the flow of fluid therethrough.

23. A breakaway assembly comprising:
a first connector;
a second connector, wherein said assembly is movable between a first configuration in which said first and second connectors are coupled together and define a fluid path through which fluid may flow, and a second configuration in which said first and second connectors are not coupled together, wherein said assembly is configured to move from said first configuration to said second configuration when a sufficient separation force is applied to said assembly;
a valve positioned in one of said first or second connectors; and
a retaining portion positioned in the other one of said first or second connectors, wherein said retaining portion is configured to retain said valve in an open position when said assembly is in said first configuration to allow fluid to flow through said valve, wherein said valve is configured to move to a closed position when said assembly moves to said second configuration to generally block the flow of fluid therethrough, wherein said valve and said retaining portion are configured to cooperate to define a ball and socket joint which enables pivoting and rotation thereabout when said assembly is in said first configuration.

24. The assembly of claim 23 wherein one of said valve or said retaining portion includes a spherical surface and the other one of said valve or retaining portion includes a component which movably engages said spherical surface when said assembly is in said first configuration.

25. The assembly of claim 23 wherein said first connector is rotatable three hundred and sixty degrees relative to said second connector about a central axis of said first connector via said ball and socket joint when said assembly is in said first configuration, and wherein said first connector is pivotable at least about twenty-five degrees about an axis perpendicular to said central axis via said ball and socket joint when said assembly is in said first configuration.

26. The assembly of claim 23 wherein said valve includes a poppet that is spring biased to its closed position, and wherein said retaining portion is configured to engage said poppet and retain said poppet in said open position when said assembly is in said first configuration.

27. The assembly of claim 26 wherein said retaining portion is configured to be entirely spaced apart from, and not engage, said poppet when said assembly is in said second configuration.

28. The assembly of claim 23 further comprising a supplemental ball and socket joint, and wherein said ball and socket joint is positioned within said supplemental ball and socket joint.

29. The assembly of claim 28 wherein said ball and socket joint is generally concentrically positioned within said supplemental ball and socket joint.

30. The assembly of claim 28 wherein one of said first or second connectors includes said supplemental ball and socket joint, and wherein said one of said first or second connector which includes said supplemental ball and socket joint removably receives at least part of the other one of said connectors therein when said assembly is in said first configuration.

31. The assembly of claim 23 wherein first and second connectors are releasably coupled together at a coupling location when said assembly is in said first configuration, and wherein said coupling location is positioned radially outside said ball and socket joint.

32. The assembly of claim 31 wherein said first connector includes a supplemental ball and socket joint which receives at least part of said second connector therein, and wherein said coupling location is positioned radially inside said supplemental ball and socket joint.

33. The assembly of claim 23 wherein said connectors are directly coupled together when said assembly is in said first configuration, and wherein said connectors are uncoupled and spaced apart from each other when said assembly is in said second configuration.

34. The assembly of claim 23 wherein one of said first and second connectors is fluidly coupled to a fuel dispensing nozzle for dispensing fuel into an automobile fuel tank, and wherein the other one of said first and second connectors is fluidly coupled to a fuel pump.

35. The assembly of claim 23 wherein assembly is movable from said first configuration to said second configuration such that said first and second connectors are separated when a sufficient separation force is applied to said assembly, after which said first and second connectors are reattachable to configure said assembly in said first configuration without requiring any repair or replacement of any components of said assembly.

36. The assembly of claim 23 wherein said assembly is configured such that, when said assembly is in said first configuration, said fluid path extends generally axially entirely through said assembly such that fluid enters an upstream axial end of one of said connectors and exits a downstream axial end of the other one of said connectors.

37. A breakaway assembly comprising:
a first connector;
a second connector, wherein said assembly is movable between a first configuration in which said first and second connectors are coupled together and define a fluid path through which fluid may flow, and a second configuration in which said first and second connectors are not coupled together, wherein said assembly is configured to move from said first configuration to said second configuration when a sufficient separation force is applied to said assembly;
one of said first or second connectors having a first ball and socket joint which receives at least part of the other connector therein to thereby enable pivoting and rotation thereabout when said assembly is in said first configuration;
a valve positioned in one of said first or second connectors; and
a retaining portion positioned in the other of said first or second connectors than the one in which said valve is positioned, wherein said retaining portion is configured to retain said valve in an open position when said assembly is in said first configuration to allow fluid to flow through said valve, wherein said valve is configured to move to a closed position when said assembly moves to said second configuration to generally block the flow of fluid therethrough, wherein said valve and said retaining portion are configured to cooperate to define a second ball and socket joint generally concentric with said first ball and socket joint.

38. A breakaway assembly comprising:
a first connector;
a second connector, wherein said assembly is movable between a first configuration in which said first and second connectors are coupled together and define a fluid path through which fluid may flow, and a second configuration in which said first and second connectors are not coupled together, wherein said assembly is configured to move from said first configuration to said second configuration when a sufficient separation force is applied to said assembly, wherein said first connector and second connector each include an engagement surface, and wherein said engagement surfaces are configured to engage each other to retain said assembly in said first configuration until said sufficient separation force is applied to said assembly, and wherein at least one of said engagement surfaces is deflectable;
a deformable or compressible element configured to be deformed or compressed when said at least one of said engagement surfaces is deflected, wherein said deformable or compressible element is positioned radially outside said at least one of said engagement surfaces; and
a valve positioned in one of said first or second connectors, wherein said valve is configured to be in an open position when said assembly is in said first configuration to allow fluid to flow therethrough, and to move to a closed position when said assembly is moved to said second configuration to generally block the flow of fluid therethrough.

39. The assembly of claim 38 wherein said at least one engagement surface is configured to be deflected radially outwardly when said assembly moves from said first configuration to said second configuration, and when said assembly moves from said second configuration to said first configuration.

40. The assembly of claim 38 wherein said engagement surfaces of said first and second connectors are angled with respect to a central axis of said assembly.

41. The assembly of claim 38 wherein one of said first or second connectors includes a ball portion with a generally spherical surface and a socket portion with a generally spherical surface which movably receives said ball portion therein, and wherein said engagement surfaces are axially and radially positioned within said ball portion when said assembly is in said first configuration.

42. The assembly of claim 41 wherein said deformable or compressible element is axially and radially positioned within said ball portion.

43. The assembly of claim 38 wherein said engagement surfaces of said first and second connectors are angled with respect to a central axis of said assembly.

44. A breakaway assembly comprising:
a first connector;
a second connector, wherein said assembly is movable between a first configuration in which said first and second connectors are coupled together and define a fluid path through which fluid may flow, and a second configuration in which said first and second connectors are not coupled together, wherein said assembly is configured to move from said first configuration to said second configuration when a sufficient separation force is applied to said assembly, wherein said first connector and second connector each include an engagement surface;

a biasing element configured to urge at least one of said engagement surfaces is into engagement with the other to generally retain said assembly in said first configuration until said sufficient separation force is applied to said assembly, wherein said biasing element is a separate and discrete component relative to said at least one of said engagement surfaces; and a valve positioned in one of said first or second connectors, wherein said valve is configured to be in an open position when said assembly is in said first configuration to allow fluid to flow therethrough, and to move to a closed position when said assembly is moved to said second configuration to generally block the flow of fluid therethrough.

45. The assembly of claim 44 wherein said biasing element is positioned directly radially outside said at least one of said engagement surfaces.

46. A breakaway assembly comprising:
a first connector;
a second connector, wherein said assembly is movable between a first configuration in which said first and second connectors are coupled together and define a fluid path through which fluid may flow, and a second configuration in which said first and second connectors are not coupled together, wherein said assembly is configured to move from said first configuration to said second configuration when a sufficient separation force is applied to said assembly, wherein said first connector and second connector each include an engagement surface, and wherein said engagement surfaces are configured to engage each other to generally retain said assembly in said first configuration until said sufficient separation force is applied to said assembly, wherein one of said first or second connectors includes a ball portion with a generally spherical surface and said one of said first or second connectors includes a socket portion with a generally spherical surface which movably receives said ball portion therein, and wherein said engagement surfaces are positioned within said ball portion when said assembly is in said first configuration; and
a valve positioned in one of said first or second connectors, wherein said valve is configured to be in an open position when said assembly is in said first configuration to allow fluid to flow therethrough, and to move to a closed position when said assembly is moved to said second configuration to generally block the flow of fluid therethrough.

47. A method for using a breakaway assembly comprising:
providing a breakaway assembly including a first connector and a second connector, wherein said breakaway assembly is in a first configuration in which said first and second connectors are coupled together and define a fluid path through which fluid may flow, the breakaway assembly further including a valve positioned in one of said first or second connectors and a retaining portion positioned in the other one of said first or second connectors, wherein said retaining portion retains said valve in an open position to allow fluid to flow therethrough, and wherein said valve and said retaining portion cooperate to define a ball and socket joint which enables pivoting and rotation thereabout; and
upon the application of a sufficient separation force, allowing said assembly to move to a second configuration in which said first and second connectors are not coupled together and valve is in a closed position to generally block the flow of fluid therethrough.

48. A method for using a breakaway assembly comprising:
providing a breakaway assembly including:
a first connector;
second connector, wherein said assembly is in a first configuration in which said first and second connectors are coupled together and define a fluid path through which fluid may flow, said first connector and second connector each including an engagement surface, wherein said engagement surfaces are engaged to generally retain said assembly in said first configuration, wherein said engagement surfaces of said first and second connectors are angled with respect to a central axis of said assembly;
a deformable or compressible element positioned radially outside at least one of said engagement surfaces; and
a valve positioned in one of said first or second connectors, wherein said valve is in an open position to allow fluid to flow therethrough; and
upon the application of a sufficient separation force, allowing at least one of said engagement surfaces to be deflected radially, thereby deforming or compressing said deformable or compressible element and enabling said assembly to move to a second configuration in which said first and second connectors are not coupled together and said valve is in a closed position to generally block the flow of fluid therethrough.

* * * * *

UNITED STATES PATENT AND TRADEMARK OFFICE
CERTIFICATE OF CORRECTION

| | |
|---|---|
| PATENT NO. | : 8,931,499 B2 |
| APPLICATION NO. | : 13/303604 |
| DATED | : January 13, 2015 |
| INVENTOR(S) | : Bryan William Clever and Matthew Ryan Lauber |

It is certified that error appears in the above-identified patent and that said Letters Patent is hereby corrected as shown below:

In the Claims

In Claim 43, Column 18, Lines 55-57, it reads:

"The assembly of claim 38 wherein said engagement surfaces of said first and second connectors are angled with respect to a central axis of said assembly."

Claim 43 should be omitted.

Signed and Sealed this
Second Day of June, 2015

Michelle K. Lee
*Director of the United States Patent and Trademark Office*